No. 836,016. PATENTED NOV. 13, 1906.
M. J. DONER.
ROUNDABOUT.
APPLICATION FILED AUG. 7, 1905.
2 SHEETS—SHEET 1.
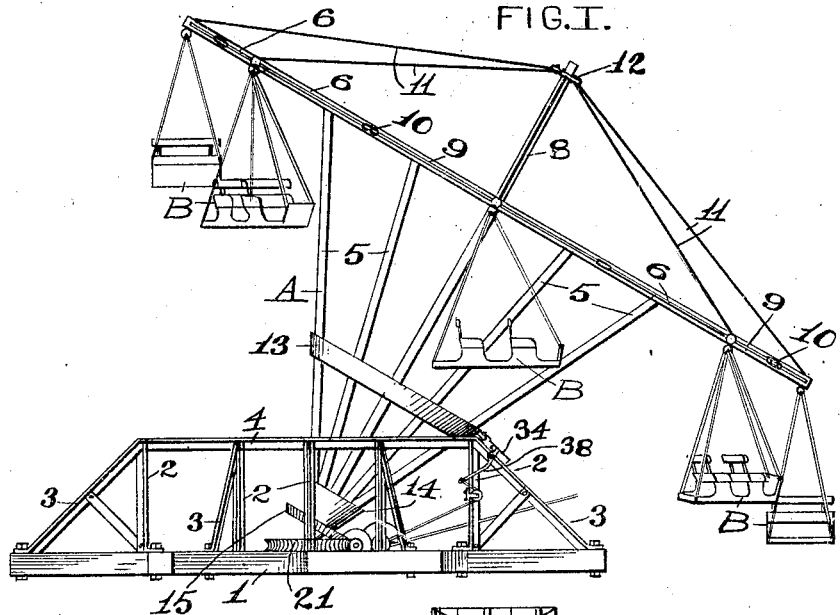
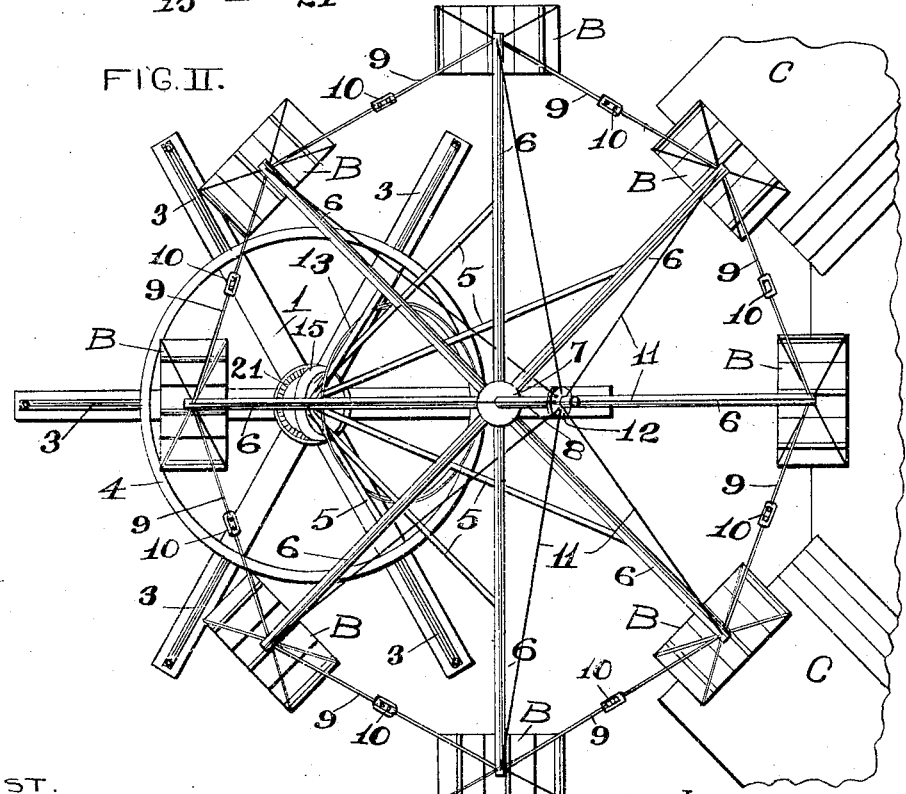
ATTEST.
H. G. Fletcher.
Nellie I. Alexander.
INVENTOR.
M. J. DONER.
BY
ATTY'S
THE NORRIS PETERS CO., WASHINGTON, D. C.

No. 836,016. PATENTED NOV. 13, 1906.
M. J. DONER.
ROUNDABOUT.
APPLICATION FILED AUG. 7, 1905.
2 SHEETS—SHEET 2.
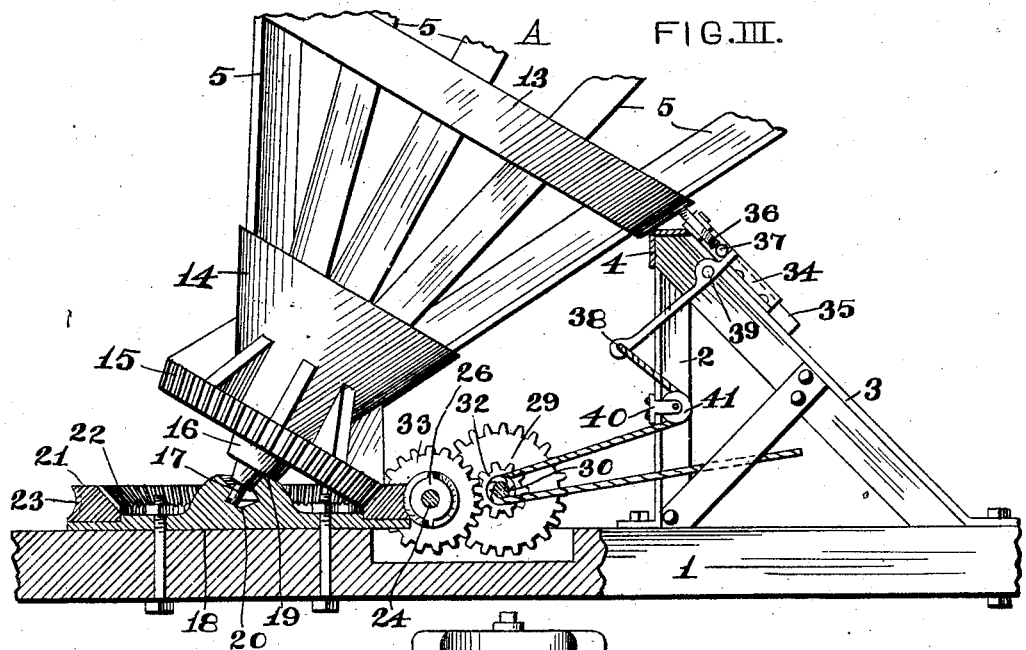
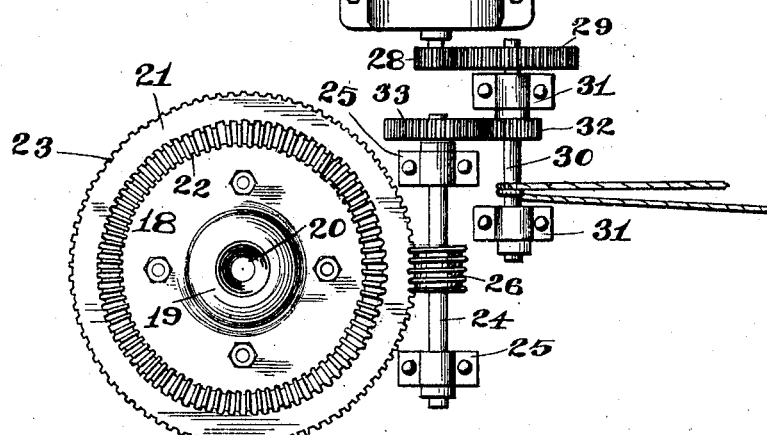
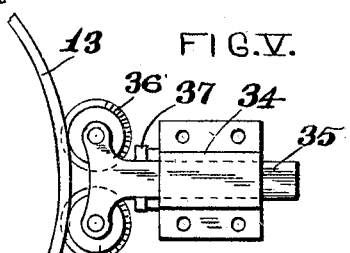
ATTEST.
H. G. Fletcher.
Nellie E. Alexander.
INVENTOR.
M. J. DONER.
BY Knight Bros.
ATTY'S.

UNITED STATES PATENT OFFICE.

MARTIN J. DONER, OF ST. LOUIS, MISSOURI, ASSIGNOR OF ONE-HALF TO LOUIS J. EAGEN, OF CHICAGO, ILLINOIS.

ROUNDABOUT.

No. 836,016.      Specification of Letters Patent.      Patented Nov. 13, 1906.

Application filed August 7, 1905. Serial No. 273,030.

*To all whom it may concern:*

Be it known that I, MARTIN J. DONER, a citizen of the United States, residing in the city of St. Louis, in the State of Missouri, have invented certain new and useful Improvements in Roundabouts, of which the following is a full, clear, and exact description, reference being had to the accompanying drawings, forming part of this specification.

My invention relates to a roundabout or circular swing for amusement, the device being so constructed as to cause the swing-cars to travel in a circular path and with a gyratory rise-and-fall motion.

Figure I is an elevation of my roundabout. Fig. II is a top or plan view. Fig. III is an enlarged view, partly in elevation and partly in vertical section. Fig. IV is a plan view of the gearing by which the turret of my roundabout is driven. Fig. V is a plan view of the elevating device by which the turret is raised from contact with the track-rail on which it rides.

1 designates the foundation or base framework of my roundabout. This foundation is surmounted by a plurality of posts 2, that are stayed by braces 3, the posts and braces being preferably of metal and of T shape in cross-section. The series of posts 2 are arranged in the form of a circle, and surmounting the posts is a track-rail 4, that is preferably of angle shape in cross-section and is of circular shape, as seen most clearly in Fig. II, the angle of said track-rail facing inwardly, as seen in Fig. III.

A designates a revolving turret, that is preferably of skeleton form and made up of a plurality of T-beams 5, the lower ends of which are assembled. The upper ends of the beams 5 are spread apart and suitably secured to a plurality of arms 6, the inner ends of which are connected to a head 7, rigidly mounted on a center post 8, that forms the central member of the turret A. The outer ends of the arms 6 are united by stay-rods 9, that are preferably provided with turnbuckles 10. 11 represents guy wires or ropes that serve as supports for the outer ends of the arms 6 and are suitably attached to the terminations of the arms and to a collar 12, rigidly fitted to the upper end of the turret center post 8. The beams 5 of the turret are brought together at their lower ends, and surrounding said beams at an elevation corresponding to that occupied by the track-rail 4 is a bearing-ring 13, of tapering form, that rides against said track-rail.

The lower assembled ends of the turret-beams 5 are seated in a turn-base 14, that is socketed at its upper side to receive said beams. This turn-base is provided with a tapering circular gear 15, and at its lower side is a bearing-boss 16, that is provided with a gudgeon 17.

18 is a face-plate mounted upon the central portion of the foundation 1 and provided with a center bearing 19, on which the bearing-boss 16 rests and rides, and a pocket 20 within said center bearing, in which the gudgeon 17 seats.

21 designates a gear-ring that is loosely seated on the base-plate 18 to revolve thereon and is provided interiorly with a tapering gear-face 22, with which the gear 15 of the turn-base 14 meshes. The gear-ring 21 is provided exteriorly with a worm-face 23.

24 designates a worm-shaft, that extends at an angle to the axis of the gear-ring 21 and is journaled in bearing-boxes 25, mounted upon the foundation 1. This worm-shaft bears a worm 26, that is arranged in mesh with the worm-face 23 of the ring 21.

27 designates a motor, that may be of any common type. On the shaft of this motor is a pinion 28, that meshes with a gear-wheel 29 on a shaft 30, journaled in boxes 31. On the shaft 30 is also a pinion 32, that meshes with a gear-wheel 33, fixed to the worm-shaft 24, and by which said last-named shaft is rotated to cause the worm 26 to impart rotation to the gear-ring 21 while the motor 27 is in operation.

When my roundabout is in use, continuous rotation is imparted to the gear-ring 21 through the medium of the driven worm 26 meshing therewith, which is operated due to its being geared to the motor 27. As the gear-ring rotates and imparts rotation to the turret A by reason of the meshing of the gear 15 of the turn-base 14 with the interior gear-face of the ring 21, the bearing-ring 13 of the turret rides upon the circular track-rail 4, making continuous circuits of said track-rail, the turret A lying in an inclined position while said circuits are being made. As a consequence of this movement of the turret swings B, flexibly suspended from the turret-arms 6, are carried in a circular path and the axis of the turret being at an angle to a perpendicular line the swings partake of a rise-and-fall motion while they are moving in a circular path. When the swings are in the lowest positions, they pass adjacent to a platform C from and onto which they are loaded and unloaded.

To provide for the cessation of travel of the turret in the circle within the trace-rail 4 while the swings are being loaded and unloaded from time to time, so that the turret will revolve in a settled position, I utilize an elevating device fro raising the turret from said track-rail. This elevating device consists of the following parts: 34 is a boxing fixed to one of the braces 3. (See Figs. I and III.) 35 is a reciprocating lift-bar, that is slidably positioned in the boxing 34 and has journaled in its forward end a pair of rollers 36, that oppose the turret bearing-ring 13. (See Figs. III and V.) 37 represents studs projecting from the sides of said lift-bar. 38 is a lever pivoted at 39 to the bars on which the lift-bar and its boxing are mounted, the upper end of this lever being positioned at the rear of the studs 37 to press thereagainst. 40 is a pull-cable, that is connected with the lower end of the lever 38 and passes therefrom to a pulley 41, from which it is continued to the motor-driven shaft 30 and wrapped around said shaft, as seen in Figs. III and IV. When it is desired to stop the travel of the turret on the track-rail 4, but permit continued rotation of the turret, the cable 40 is drawn taut and the shaft 30, on which the cable is wrapped, acts as a winch to effect a pull upon the cable and swing the lever 38 in a manner to cause it to elevate the lift-bar 35. As the lift-bar moves upwardly it carries therewith the rollers 36, that move into bearing with the bearing-ring 13 and throw said bearing-ring away from the track-ring 4, with the result that the turret will continue its rotation with the ring 13 and rollers 36 as the upper bearing members on which it rotates in a fixed location. While the turret is so positioned the swings may be readily filled and emptied when they approach the platform or platforms C, located at the side of the roundabout at which the turret is lifted from the track-rail.

I claim as my invention—

1. In a roundabout, the combination of a suitably-supported circular track-rail, a turret located within the circle of said track-rail and having bearing thereagainst, means for imparting rotation to said turret, and means for elevating said turret from said track-rail, substantially as set forth.

2. In a roundabout, the combination of a suitably-supported track-rail of circular form, a turret located within the circle of said track-rail, a bearing-ring forming a part of said turret and arranged to ride against said track-rail, means for imparting rotation to said turret, and means arranged for movement to said bearing-ring to move it away from said track-rail, substantially as set forth.

3. In a roundabout, the combination of a suitably-supported circular track-rail, a turret situated in the circle of said track-rail and bearing thereagainst, a turn-base forming a part of said turret and provided with a gear, a base-plate in which said turn-base is loosely seated, a gear-ring having engagement with the gear of said turn-base, and means for rotating said gear-ring, substantially as set forth.

4. In a roundabout, the combination of a suitably-supported circular track-rail, a turret rotatably positioned within the circle of said track-rail and adapted to bear thereagainst, means for rotating said turret, a lift-bar located adjacent to said track-rail, rollers carried by said lift-bar, and means for moving said lift-bar toward said turret, substantially as set forth.

5 In a roundabout, the combination of a suitably-supported circular track-rail, a turret positioned within the circle of said track-rail, a bearing-ring forming a part of said turret and adapted to ride against said track-rail, a lift-bar located adjacent to said track-rail, rollers journaled in said lift-bar adapted to be moved with said bar to the bearing-ring of said turret, a lever having engagement with said bar, and means for moving said lever, substantially as set forth.

MARTIN J. DONER.

In presence of—
  E. S. KNIGHT,
  NELLIE V. ALEXANDER.